(12) United States Patent
Kim et al.

(10) Patent No.: US 11,894,558 B2
(45) Date of Patent: Feb. 6, 2024

(54) POSITIVE ELECTRODE ACTIVE MATERIAL, METHOD OF PREPARING THE SAME, POSITIVE ELECTRODE INCLUDING THE POSITIVE ELECTRODE ACTIVE MATERIAL, AND SECONDARY BATTERY INCLUDING THE POSITIVE ELECTRODE

(71) Applicant: LG Chem, Ltd., Seoul (KR)

(72) Inventors: Seul Ki Kim, Daejeon (KR); Hye Lim Jeon, Daejeon (KR); Tae Gon Kim, Daejeon (KR); Wang Mo Jung, Daejeon (KR); Sang Wook Lee, Daejeon (KR)

(73) Assignee: LG Energy Solution, Ltd.

( * ) Notice: Subject to any disclaimer, the term of this patent is extended or adjusted under 35 U.S.C. 154(b) by 792 days.

(21) Appl. No.: 17/042,518

(22) PCT Filed: Apr. 5, 2019

(86) PCT No.: PCT/KR2019/004027
§ 371 (c)(1),
(2) Date: Sep. 28, 2020

(87) PCT Pub. No.: WO2019/194613
PCT Pub. Date: Oct. 10, 2019

(65) Prior Publication Data
US 2021/0013511 A1 Jan. 14, 2021

(30) Foreign Application Priority Data
Apr. 6, 2018 (KR) .......................... 10-2018-0040575

(51) Int. Cl.
*H01M 4/525* (2010.01)
*H01M 4/04* (2006.01)
(Continued)

(52) U.S. Cl.
CPC ......... *H01M 4/525* (2013.01); *H01M 4/0471* (2013.01); *H01M 4/133* (2013.01);
(Continued)

(58) Field of Classification Search
CPC .... H01M 4/366; H01M 4/525; H01M 4/0471; H01M 4/133; H01M 4/1393
See application file for complete search history.

(56) References Cited

U.S. PATENT DOCUMENTS

2012/0088151 A1  4/2012  Yamazaki et al.
2014/0079961 A1  3/2014  Zhong et al.
(Continued)

FOREIGN PATENT DOCUMENTS

CN   102916165 A   2/2013
CN   104812566 A   7/2015
(Continued)

OTHER PUBLICATIONS

Search report from International Application No. PCT/KR2019/004027, dated Jul. 15, 2019.
(Continued)

*Primary Examiner* — Nathanael T Zemui
(74) *Attorney, Agent, or Firm* — Lerner David LLP (57) ABSTRACT

A positive electrode active material includes a core and a coating layer disposed on the core, wherein the core includes $Li_{1+x}MO_{2+y}$, wherein M is at least one element selected from the group consisting of nickel (Ni), cobalt (Co), and copper (Cu), and $1 \leq x \leq 5$ and $0 \leq y \leq 2$, and the coating layer includes carbon-based particles, wherein the carbon-based particle includes a structure in which a plurality of graphene sheets are connected, the carbon-based particle has an oxygen content of 1 wt % or more in the carbon-based particle, and the carbon-based particle has a D/G peak ratio of 1.55 or less during Raman spectrum measurement. A method of prepar-
(Continued)

ing the positive electrode active material, a positive electrode including the positive electrode active material, and a secondary battery including the positive electrode are also provided.

20 Claims, 3 Drawing Sheets

(51) Int. Cl.
*H01M 4/133* (2010.01)
*H01M 4/1393* (2010.01)
*H01M 4/02* (2006.01)

(52) U.S. Cl.
CPC .... *H01M 4/1393* (2013.01); *H01M 2004/027* (2013.01); *H01M 2004/028* (2013.01)

(56) References Cited

U.S. PATENT DOCUMENTS

| | | |
|---|---|---|
| 2014/0147648 A1 | 5/2014 | Zhamu et al. |
| 2015/0086853 A1 | 3/2015 | Matsuno et al. |
| 2016/0285102 A1 | 9/2016 | Shitaba et al. |
| 2017/0073834 A1 | 3/2017 | Zhamu et al. |
| 2017/0221644 A1 | 8/2017 | Kubota et al. |
| 2018/0233734 A1 | 8/2018 | Ahn et al. |

FOREIGN PATENT DOCUMENTS

| | | |
|---|---|---|
| JP | H0896796 A | 4/1996 |
| JP | H10284057 A | 10/1998 |
| JP | 2009035598 A | 2/2009 |
| JP | 2015065000 A | 4/2015 |
| JP | 2016096125 A | 5/2016 |
| JP | 2016122670 A | 7/2016 |
| JP | 2016189321 A | 11/2016 |
| JP | 2017130557 A | 7/2017 |
| KR | 20130079109 A | 7/2013 |
| KR | 20150089028 A | 8/2015 |
| KR | 20150141924 A | 12/2015 |
| KR | 20160085834 A | 7/2016 |
| KR | 20170111069 A | 10/2017 |
| KR | 20170113212 A | 10/2017 |
| WO | 2015146899 A1 | 10/2015 |

OTHER PUBLICATIONS

Extended European Search Report for Application No. 19781902.2, dated Mar. 19, 2021, 8 pages.

He, J. et al., "Synthesis and electrochemical properties of graphene-modified LiCo1/3Ni1/3Mn1/3O2 cathodes for lithium ion batteries", RSC Advances, Nov. 2013, pp. 2568-2572.

Search Report dated Jan. 4, 2023 from the Office Action for Chinese Application No. 201980024477.4 dated Jan. 11, 2023, pp. 1-2. [See p. 1, categorizing the cited references].

POSITIVE ELECTRODE ACTIVE MATERIAL, METHOD OF PREPARING THE SAME, POSITIVE ELECTRODE INCLUDING THE POSITIVE ELECTRODE ACTIVE MATERIAL, AND SECONDARY BATTERY INCLUDING THE POSITIVE ELECTRODE

CROSS REFERENCE TO RELATED APPLICATIONS

This application is a national phase entry under 35 U.S.C. § 371 of International Application No. PCT/KR2019/004027, filed Apr. 5, 2019, which claims priority to of Korean Patent Application No. 10-2018-0040575, filed on Apr. 6, 2018, the disclosures of which are incorporated herein reference.

TECHNICAL FIELD

The present invention relates to a positive electrode active material including a core and a coating layer disposed on the core, wherein the core includes $Li_{1+x}MO_{2+y}$, wherein M is at least one element selected from the group consisting of nickel (Ni), cobalt (Co), and copper (Cu), and $1 \leq x \leq 5$ and $0 \leq y \leq 2$, and the coating layer includes carbon-based particles, wherein the carbon-based particle includes a structure in which a plurality of graphene sheets are connected, the carbon-based particle has an oxygen content of 1 wt % or more in the carbon-based particle, and the carbon-based particle has a D/G peak ratio of 1.55 or less during Raman spectrum measurement, a method of preparing the positive electrode active material, a positive electrode including the positive electrode active material, and a secondary battery including the positive electrode.

BACKGROUND ART

Demand for batteries as an energy source has been significantly increased as technology development and demand with respect to mobile devices have recently increased, and a variety of researches on batteries capable of meeting various needs have been carried out accordingly. Particularly, as a power source for such devices, research into lithium secondary batteries having excellent lifetime and cycle characteristics as well as high energy density has been actively conducted.

A lithium secondary battery denotes a battery in which a non-aqueous electrolyte containing lithium ions is included in an electrode assembly which includes a positive electrode including a positive electrode active material capable of intercalating/deintercalating the lithium ions, a negative electrode including a negative electrode active material capable of intercalating/deintercalating the lithium ions, and a microporous separator disposed between the positive electrode and the negative electrode.

SiO having high capacity may be used as the negative electrode active material to prepare a battery having high capacity. However, since the SiO has low charge and discharge efficiency, lithium ions transferred from the positive electrode during initial charge are consumed, and thus, there is a limitation in that it is difficult to improve the capacity of the battery to a desired level.

In order to address this limitation, there is an attempt to solve the above-described irreversible capacity problem by adding lithium to a negative electrode active material layer (Chinese Patent Application Laid-open Publication No. 102916165). However, in a case in which a separate layer composed of lithium is disposed on the negative electrode active material layer through these techniques, since a native oxide is formed due to high reactivity of the lithium, the irreversible capacity problem may not be solved smoothly.

Alternatively, a method of solving the above-described irreversible capacity problem by using a material, which may act as a lithium ion source or lithium ion storage and may exhibit electrochemical activity after the first cycle, as a positive electrode active material, has been studied. Specifically, there is a method of using a lithium metal oxide containing an excessive amount of lithium, such as $Li_6CoO_4$, as a positive electrode active material. However, since most of these positive electrode active materials are very vulnerable to moisture, structural collapse may occur when exposed to the atmosphere.

Thus, there is a need for a positive electrode active material which may provide lithium to the negative electrode at a high level and may minimize the structural collapse by effectively blocking contact with moisture.

DISCLOSURE OF THE INVENTION

Technical Problem

An aspect of the present invention provides a positive electrode active material, which may provide lithium to a negative electrode at a high level and may minimize structural collapse by effectively blocking contact with moisture, a method of preparing the positive electrode active material, a positive electrode including the positive electrode active material, and a secondary battery including the positive electrode, and, specifically, life characteristics and charge capacity of the secondary battery may be improved.

Technical Solution

According to an aspect of the present invention, there is provided a positive electrode active material including a core and a coating layer disposed on the core, wherein the core includes $Li_{1+x}MO_{2+y}$, wherein M is at least one element selected from the group consisting of nickel (Ni), cobalt (Co), and copper (Cu), and $1 \leq x \leq 5$ and $0 \leq y \leq 2$, and the coating layer includes carbon-based particles, wherein the carbon-based particle includes a structure in which a plurality of graphene sheets are connected, the carbon-based particle has an oxygen content of 1 wt % or more in the carbon-based particle, and the carbon-based particle has a D/G peak ratio of 1.55 or less during Raman spectrum measurement.

According to another aspect of the present invention, there is provided a method of preparing a positive electrode active material which includes: preparing carbon-based particles, and disposing the carbon-based particles on a core, wherein the preparing of the carbon-based particles includes preparing preliminary carbon-based particles, and modifying the preliminary carbon-based particles by an oxidation treatment, wherein the modifying of the preliminary carbon-based particles by the oxidation treatment includes at least one of a) performing a first heat treatment of the preliminary carbon-based particles at a temperature of 200° C. to 800° C. in at least one atmosphere of an oxygen atmosphere and an air atmosphere; and b) reacting the preliminary carbon-based particles with an acidic vapor at 120° C. to 300° C., and the core includes $Li_{1+x}MO_{2+y}$, wherein M is at least one element selected from the group consisting of Ni, Co, and Cu, and $1 \leq x \leq 5$ and $0 \leq y \leq 2$.

According to another aspect of the present invention, there is provided a positive electrode including the positive electrode active material.

According to another aspect of the present invention, there is provided a secondary battery including the positive electrode; a negative electrode; a separator disposed between the positive electrode and the negative electrode; and an electrolyte.

Advantageous Effects

According to the present invention, since a positive electrode active material includes a core including $Li_{1+x}MO_{2+y}$, lithium ions may be sufficiently supplied to a negative electrode. Accordingly, even if $SiO_x(0 \leq x \leq 2)$, in which capacity loss caused by irreversible capacity during initial charge and discharge is large due to low charge and discharge efficiency, is included in the negative electrode, the above-described irreversible capacity problem may be solved by $Li_{1+x}MO_{2+y}$, which exhibits electrochemical activity after the first cycle, while not causing performance degradation of an entire battery. Also, the positive electrode active material includes a coating layer including carbon-based particles introduced in the present invention, and the carbon-based particles may effectively cover a surface of the core. Accordingly, since contact between the core and external moisture is effectively blocked, structural collapse of the core may be prevented. As a result, charge capacity and life characteristics of the battery may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

<Positive Electrode Active Material>

A positive electrode active material according to an embodiment of the present invention includes a core and a coating layer disposed on the core, wherein the core includes $Li_{1+x}MO_{2+y}$, wherein M is at least one element selected from the group consisting of nickel (Ni), cobalt (Co), and copper (Cu), and $1 \leq x \leq 5$ and $0 \leq y \leq 2$, and the coating layer includes carbon-based particles, wherein the carbon-based particle includes a structure in which a plurality of graphene sheets are connected, the carbon-based particle may have an oxygen content of 1 wt % or more in the carbon-based particle, and the carbon-based particle may have a D/G peak ratio of 1.55 or less during Raman spectrum measurement.

The core includes $Li_{1+x}MO_{2+y}$, wherein M is at least one element selected from the group consisting of Ni, Co, and Cu, and $1 \leq x \leq 5$ and $0 \leq y \leq 2$. Specifically, the $Li_{1+x}MO_{2+y}$ may include at least one selected from the group consisting of $Li_2NiO_2$, $Li_6CoO_4$, and $Li_2CuO_2$. Since the core includes the $Li_{1+x}MO_{2+y}$, lithium may be sufficiently supplied to a negative electrode. Also, since the $Li_{1+x}MO_{2+y}$ exhibits electrochemical activity after the first cycle while not causing degradation of overall battery performance, battery capacity loss due to irreversible capacity may be eliminated even if the negative electrode includes $SiO_x(0 \leq x \leq 2)$ exhibiting high irreversible capacity.

The core may have an average particle diameter ($D_{50}$) of 6 μm to 20 μm, particularly 13 μm to 18 μm, and more particularly 14 μm to 17 μm. In the present specification, the average particle diameter ($D_{50}$) may be defined as a particle diameter at a cumulative volume of 50% in a particle size distribution curve. The average particle diameter ($D_{50}$), for example, may be measured by using a laser diffraction method. The laser diffraction method may generally measure a particle diameter ranging from a submicron level to a few mm and may obtain highly repeatable and high-resolution results.

The coating layer may be disposed on the core. Specifically, the coating layer may cover a surface of the core.

The coating layer may include carbon-based particles.

The carbon-based particle may include a structure in which a plurality of graphene sheets are connected. The expression "graphene sheet" in the present invention denotes a carbonaceous structure having a thickness of 20 nm or less, flexibility, and a thin film shape. Specifically, in the carbon-based particle, at least two graphene sheets may be directly connected to each other or may be indirectly connected. Since the carbon-based particles include the structure in which the plurality of graphene sheets are connected, the surface of the core may be smoothly covered with the carbon-based particles. That is, since most of the surface of the core is covered with the carbon-based particles, contact between the core and external moisture is effectively blocked, and thus, structural collapse of the core may be prevented.

The carbon-based particle may be in the form of a secondary particle which is formed by the connection of the plurality of graphene sheets. Specifically, the plurality of graphene sheets may be interconnected to form a secondary particle in the form of a long chain, and, more specifically, the secondary particle in the form of a chain may partially include an aggregated region of the plurality of graphene sheets. Since the secondary particle has a unique connection structure in the form of a chain, electrical conductivity and thermal conductivity of the carbon-based particle are excellent.

The carbon-based particle may further include a connection portion connected to at least a part of the graphene sheets of the plurality of graphene sheets. In the present invention, during the preparation of the carbon-based particles, preliminary carbon-based particles are ruptured by continuous oxidation to form the graphene sheets and a portion retaining its original shape without being ruptured may also be present. In this case, the portion retaining its shape may correspond to the connection portion. Thus, the connection portion may have a non-graphene shape, and the expression "non-graphene shape", different from the above-described graphene sheet, may denote a lump shape having a thickness greater than the graphene sheet.

A portion of each of the plurality of graphene sheets may be directly connected to each other. Alternatively, at least a portion of the graphene sheets of the plurality of graphene sheets may be connected to each other through the connection portion, and, specifically, at least a portion of each of the plurality of graphene sheets may be connected to the connection portion. The carbon-based particles may include both of the two connection methods.

Figure 1:
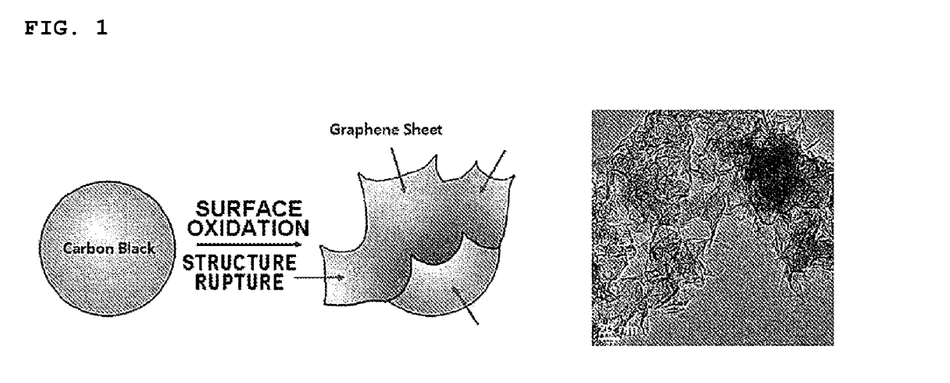
FIG. 1 is a schematic view illustrating a process of forming graphene sheets of a carbon-based particle included in a positive electrode active material of the present invention and a transmission electron microscope (TEM) image.

The carbon-based particles may be formed by modification of carbon black in the form of a near-spherical particle, for example, acetylene black, furnace black, thermal black, channel black, and lamp black, by an oxidation treatment. Referring to a schematic view of FIG. 1, a structure of carbon black may be modified by the oxidation treatment to form particles including a plurality of graphene sheets. In a case in which the carbon black is in the form of a secondary particle, a carbon-based particle in the form of a secondary particle, in which particles including the plurality of graphene sheets are aggregated, may be formed.

The graphene sheet may have an average thickness of 10 nm or less, particularly 0.34 nm to 10 nm, and more particularly 0.34 nm to 5 nm. In a case in which the average thickness of the graphene sheet satisfies the above range, flexibility that is unique to the graphene sheet may be expressed, and electrical conductivity of the carbon-based particles may be excellent because surface contact due to the graphene sheet is improved. The graphene sheet may have a shape in which 10 or fewer graphene layers are stacked.

The graphene sheet may have a lateral size of 200 nm or less, particularly 150 nm or less, and more particularly 10 nm to 100 nm, for example, 50 nm to 90 nm. The lateral size of the graphene sheet may be controlled depending on a degree of heat treatment, and, for example, the lateral size of the graphene sheet may be controlled by further performing an additional heat treatment in an inert atmosphere after the oxidation treatment. In a case in which the lateral size of the graphene sheet satisfies the above range, ions in an electrolyte solution may smoothly diffuse in an electrode. Thus, rapid charging characteristics of a battery may be improved and rate capability may also be improved. Also, since the graphene sheets may effectively cover the surface of the core, the contact between the core and the external moisture may be effectively blocked, and thus, the structural collapse of the core may be prevented. Accordingly, initial charge capacity of the battery may be improved.

The lateral size of the graphene sheet denotes an average of sizes of 100 graphene sheets observed by a scanning electron microscope (SEM) or a transmission electron microscope (TEM), and, herein, the expression "size" denotes the longest length when assuming a line from one point to another point in one graphene sheet.

The carbon-based particle may have an oxygen content of 1 wt % or more, for example, 1 wt % to 10 wt % in the carbon-based particle. In a case in which the oxygen content of the carbon-based particle satisfies the above range, since the carbon-based particles may be smoothly dispersed in a dispersion when a coating layer is formed by a wet process, the coating layer may be more uniformly formed. The oxygen content may be measured by carbon (C), hydrogen (H), oxygen (O), nitrogen (N) elemental analysis.

The oxygen content may be achieved during the oxidation treatment of the carbon black. Specifically, an oxygen-containing functional group may be formed on a surface of the carbon-based particle by the oxidation treatment. The oxygen-containing functional group may be at least one selected from the group consisting of a carboxyl group, a hydroxy group, and a carbonyl group. After the oxidation treatment, the oxygen content may be further controlled by performing a heat treatment on the carbon-based particles in an inert atmosphere.

From this point of view, the carbon-based particle is different from a typical graphene. That is, with respect to the typical graphene, since it is prepared by grinding particles of artificial graphite or the like, an oxygen content may not be as high as 1 wt % or more and the oxygen content is very low or only zero. Also, according to a method of preparing the typical graphene formed by the grinding, the graphene is formed one by one (graphene sheet), but, according to the present invention, the carbon-based particle including the structure, in which the plurality of graphene sheets are connected, is formed.

The carbon-based particle may have a higher degree of graphitization than the carbon black before the oxidation treatment. Specifically, since high structural stress caused by surface tension of the carbon black is partially eliminated while the graphene sheets are formed, the degree of graphitization of the prepared carbon-based particle may be increased.

The carbon-based particle may have a D/G peak ratio of 1.55 or less, particularly 0.9 to 1.5, and more particularly 1.1 to 1.4 during Raman spectrum measurement. In the Raman spectrum, a G peak near 1590 cm-1 is due to $E_{2g}$ vibration mode of $sp^2$ bonds of carbon, and a D peak near 1350 $cm^{-1}$ appears when there is a defect in the $sp^2$ bonds of carbon. That is, in a case in which the D/G peak ratio is satisfied, it denotes that a high degree of graphitization may be obtained, and, accordingly, when the carbon-based particle is used, capacity and electrical characteristics of the battery may be improved due to the high electrical conductivity of the carbon-based particle.

The carbon-based particle may have a value calculated by the following Equation 1 of 0.12 or less, particularly 0 to 0.1, and more particularly 0 to 0.07.

$$\frac{|b-a|}{a} \qquad \text{[Equation 1]}$$

In Equation 1, a is a specific surface area ($m^2/g$) of the carbon-based particle which is measured by a nitrogen adsorption Brunauer-Emmett-Teller (BET) method, and b is an iodine adsorption value (mg/g) of the carbon-based particle. In a case in which the carbon-based particle includes a pore structure in the inside thereof or between the particles, small-sized nitrogen ($N_2$) molecules may be adsorbed a lot in the pores. In contrast, since iodine (I$_2$), as a relatively larger molecule, is difficult to enter into the pores in comparison to the nitrogen, the iodine adsorption value is not large. That is, when the pore structure is present, the value according to Equation 1 is increased. In other words, in the carbon-based particle, that the value according to Equation 1 is 0.12 or less means that the carbon-based particle does not include micropores. That is, in a case in which there are no pores, since a degree of adsorption of iodine and a degree of adsorption of nitrogen are similar to each other, the value of Formula 1 is decreased. This means that the surface of the carbon-based particle is a free surface. Specifically, most of the carbon black is modified into a hollow structure by the oxidation treatment, and the structure is broken by the continuous oxidation treatment to form graphene sheets. In this case, the graphene sheets may be formed to open outward without forming the pore structure.

The carbon-based particle may have a specific surface area (m$^2$/g) measured by a nitrogen adsorption BET method of 200 m$^2$/g or more, particularly 300 m$^2$/g to 1,100 m$^2$/g, and more particularly 500 m$^2$/g to 900 m$^2$/g. In a case in which the above specific surface area range is satisfied, it means that an area of the graphene sheets in the carbon-based particle is large, and, accordingly, conductivity of the electrode may be secured even if an amount of a conductive agent in the electrode is small. Also, since the contact between the core and the external moisture is effectively blocked, the structural collapse of the core may be prevented. Accordingly, the initial charge capacity of the battery may be improved.

A weight ratio of the core to the coating layer may be in a range of 94:6 to 99.5:0.5, particularly 95:5 to 99:1, and more particularly 96:4 to 98:2. In a case in which the weight ratio satisfies the above range, since the carbon-based particles may effectively cover the surface of the core, the core may be effectively blocked from the external moisture, and thus, the structural collapse of the core may be further prevented.

<Positive Electrode>

A positive electrode according to another embodiment of the present invention may include the positive electrode active material of the above-described embodiment. Since descriptions of the positive electrode active material are the same as described above, the descriptions thereof will be omitted.

The positive electrode may include a current collector and a positive electrode active material layer which is disposed on the current collector and includes the positive electrode active material. Furthermore, the positive electrode active material layer may further include a binder.

The current collector is not particularly limited as long as it has conductivity without causing adverse chemical changes in the battery. For example, copper, stainless steel, aluminum, nickel, titanium, fired carbon, or aluminum or stainless steel that is surface-treated with one of carbon, nickel, titanium, or silver may be used as the current collector. Specifically, a transition metal that adsorbs carbon well, such as copper and nickel, may be used as the current collector. The positive electrode active material layer may be disposed on one surface or both surfaces of the current collector.

The binder may include at least one selected from the group consisting of a polyvinylidene fluoride-hexafluoropropylene copolymer (PVDF-co-HFP), polyvinylidene fluoride (PVdF), polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, poly acrylic acid, and a material having hydrogen thereof substituted with lithium (Li), sodium (Na), or calcium (Ca), or may include various copolymers thereof.

<Secondary Battery>

A secondary battery according to another embodiment of the present invention includes a negative electrode, a positive electrode, a separator disposed between the positive electrode and the negative electrode, and an electrolyte, wherein the positive electrode is the positive electrode of the above-described embodiment. Thus, descriptions of the positive electrode will be omitted.

The negative electrode may include a negative electrode collector and a negative electrode active material layer disposed on one surface or both surfaces of the negative electrode collector.

The negative electrode collector is not particularly limited as long as it has conductivity without causing adverse chemical changes in the battery. For example, copper, stainless steel, aluminum, nickel, titanium, fired carbon, or aluminum or stainless steel that is surface-treated with one of carbon, nickel, titanium, or silver may be used as the negative electrode collector. Specifically, a transition metal that adsorbs carbon well, such as copper and nickel, may be used as the current collector.

The negative electrode active material layer may include a negative electrode active material, a negative electrode conductive agent, and a negative electrode binder.

The negative electrode active material may include graphite-based active material particles or silicon-based active material particles. At least one selected from the group consisting of artificial graphite, natural graphite, graphitized carbon fibers, and graphitized mesocarbon microbeads may be used as the graphite-based active material particles, and rate capability may be improved particularly when the artificial graphite is used. At least one selected from the group consisting of silicon (Si), SiO$_x$ (0<x<2), a Si—C composite, and a Si—Y alloy (where Y is an element selected from the group consisting of alkali metal, alkaline earth metal, transition metal, a Group 13 element, a Group 14 element, a rare earth element, and a combination thereof) may be used as the silicon-based active material particles, and high capacity of the battery may be obtained particularly when Si and SiO$_x$(0<x<2) are used.

Specifically, the negative electrode active material of the present invention may be SiO$_x$(0<x<2), and may more specifically be SiO. The SiO$_x$(0<x<2) has high capacity, but may have low initial charge and discharge efficiency. Accordingly, desired capacity of the battery may not be achieved. In this regard, in a case in which the above-described positive electrode active material of the present invention is used, since the positive electrode active material includes the core including Li$_{1+x}$MO$_{2+y}$, lithium ions may be sufficiently supplied to the negative electrode. Accordingly, since a large amount of lithium ions may be supplied to the negative electrode during initial charge despite the low initial charge and discharge efficiency of SiO$_x$(0<x<2), the capacity of the battery may be improved.

The negative electrode binder may include at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylenediene monomer (EPDM), a sulfonated EPDM, a styrene-butadiene rubber (SBR), a fluorine rubber, poly acrylic acid, and a material having hydrogen thereof substituted with Li, Na, or Ca, or may include various copolymers thereof.

The negative electrode conductive agent is not particularly limited as long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers or metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The separator separates the negative electrode and the positive electrode and provides a movement path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer component may be used to secure heat resistance or mechanical strength, and the separator having a single layer or multilayer structure may be selectively used.

The electrolyte may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include a non-aqueous organic solvent and a metal salt.

As the non-aqueous organic solvent, for example, an aprotic organic solvent, such as N-methyl-2-pyrrolidone, propylene carbonate, ethylene carbonate, butylene carbonate, dimethyl carbonate, diethyl carbonate, y-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate, may be used.

Particularly, among the carbonate-based organic solvents, since ethylene carbonate and propylene carbonate, as cyclic carbonate, well dissociate a lithium salt due to high permittivity as a highly viscous organic solvent, the cyclic carbonate may be preferably used. Since an electrolyte having high electrical conductivity may be prepared when the above cyclic carbonate is mixed with low viscosity, low permittivity linear carbonate, such as dimethyl carbonate and diethyl carbonate, in an appropriate ratio and used, the cyclic carbonate may be more preferably used.

A lithium salt may be used as the metal salt, and the lithium salt is a material that is readily soluble in the non-aqueous electrolyte solution, wherein, for example, one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the electrolyte components.

According to another embodiment of the present invention, a battery module including the secondary battery as a unit cell and a battery pack including the battery module are provided. Since the battery module and the battery pack include the secondary battery having high capacity, high rate capability, and high cycle characteristics, the battery module and the battery pack may be used as a power source of a medium and large sized device selected from the group consisting of an electric vehicle, a hybrid electric vehicle, a plug-in hybrid electric vehicle, and a power storage system.

<Method of Preparing Positive Electrode Active Material>

A method of preparing a positive electrode active material according to another embodiment of the present invention includes: preparing carbon-based particles, and disposing the carbon-based particles on a core, wherein the preparing of the carbon-based particles includes preparing preliminary carbon-based particles, and modifying the preliminary carbon-based particles by an oxidation treatment, wherein the modifying of the preliminary carbon-based particles by the oxidation treatment includes at least one of a) performing a first heat treatment of the preliminary carbon-based particles at a temperature of 200° C. to 800° C. in at least one atmosphere of an oxygen atmosphere and an air atmosphere; and b) reacting the preliminary carbon-based particles with an acidic vapor at 120° C. to 300° C., and the core includes $Li_{1+x}MO_{2+y}$, wherein M is at least one element selected from the group consisting of Ni, Co, and Cu, and $1 \leq x \leq 5$ and $0 \leq y \leq 2$. The core may be the same as the core of the above-described embodiment.

The preparing of the carbon-based particles may include preparing preliminary carbon-based particles, and modifying the preliminary carbon-based particles by an oxidation treatment.

In the preparing of the preliminary carbon-based particles, the preliminary carbon-based particles may be carbon black. Specifically, the preliminary carbon-based particles may include at least one selected from the group consisting of acetylene black, furnace black, thermal black, channel black, and lamp black. More specifically, the preliminary carbon-based particles may be acetylene black which is produced at the highest temperature to basically have an excellent degree of graphitization.

The preparing of the preliminary carbon-based particles may include pyrolysis of acetylene gas, and carbon black, for example, acetylene black may be formed by the pyrolysis. The acetylene gas may be high purity acetylene gas, and may specifically be acetylene gas with a purity of 95% or more, for example, 98% or more.

The pyrolysis of the acetylene gas may be performed at a temperature of 1,500° C. or more, particularly 1,500° C. to 2,200° C., and more particularly 1,500° C. to 2,000° C. In a case in which the temperature satisfies the above range, a degree of graphitization of the prepared preliminary carbon-based particles may be high, and a degree of graphitization of the carbon-based particles thus prepared may also be high. Thus, the electrical conductivity of the carbon-based particle may be improved.

The preliminary carbon-based particles may be carbon black, but, among them, acetylene black may be preferred in terms of the following aspect. The graphene sheets, which are included in the carbon-based particles included in the coating layer of the positive electrode active material of the present invention, may be formed by modification of surfaces of the preliminary carbon-based particles by an oxidation treatment. A surface of the acetylene black formed by the pyrolysis may have a high degree of graphitization. Thus, a structure of graphene sheet may be smoothly formed when the acetylene black is subjected to the oxidation treatment in comparison to a case where other carbon blacks inevitably including some oxygen functional groups on surfaces thereof are subject to the oxidation treatment.

The pyrolysis may be performed in such a manner that, after an internal temperature of a reaction furnace is adjusted to the above temperature range, acetylene gas is introduced into the reaction furnace and the pyrolysis is instantaneously performed. Also, in the process, air, oxygen, and $H_2O$ may be further added to control density of the carbon-based particle and an oxygen functional group, and a connection structure in the carbon-based particle may be controlled.

The modifying of the preliminary carbon-based particles by the oxidation treatment may include at least one of a) performing a first heat treatment of the preliminary carbon-based particles at a temperature of 200° C. to 800° C. in at least one atmosphere of an oxygen atmosphere and an air atmosphere (step a); and b) reacting the preliminary carbon-based particles with an acidic vapor at 120° C. to 300° C. (step b).

In step a, the at least one of the oxygen atmosphere and the air atmosphere may be formed by introducing oxygen and/or air into the reaction furnace containing the preliminary carbon-based particles. Specifically, the graphene sheet structure may be formed by an oxidation process in the reaction furnace according to the settings of appropriate flow amount and rate of oxygen or air, reaction temperature, and reaction time during the first heat treatment. Also, conditions of the oxidation process may vary depending on differences in density of the preliminary carbon-based particles and an amount of the oxygen functional group.

In step a, the first heat treatment may be performed by controlling a temperature of the reaction furnace in the reaction furnace containing the preliminary carbon-based particles. The first heat treatment may be performed at a heat treatment temperature of 200° C. to 800° C., and may specifically be performed at a heat treatment temperature of 200° C. to 450° C. In a case in which the heat treatment temperature satisfies the above range, excessively rapid oxidation of the preliminary carbon-based particles may be prevented, and a graphene sheet having a desired size may be formed. The first heat treatment may be performed for 1 hour to 50 hours.

In step b, the preliminary carbon-based particles may react with an acidic vapor to be oxidized to form graphene. Specifically, the acidic vapor may be a vapor derived from an acidic solution such as HCl and $HNO_3$. A temperature of the acidic vapor reacting with the preliminary carbon-based particles may be in a range of 120° C. to 300° C.

After the modifying of the preliminary carbon-based particles by the oxidation treatment, a second heat treatment process in an inert atmosphere may be further performed to increase the size of the graphene sheet formed. Specifically, the method of preparing a positive electrode active material may further include performing a second heat treatment of the preliminary carbon-based particles modified by the oxidation treatment at a temperature of 500° C. or more in an inert atmosphere before the disposing of the carbon-based particles on the core, after the modifying of the preliminary carbon-based particles by the oxidation treatment. In this case, the inert atmosphere may be formed by vacuum or any one gas selected from the group consisting of helium, argon, and nitrogen. The second heat treatment temperature may be 500° C. or more, for example, 600° C. to 1,600° C.

A mechanism of forming the carbon-based particles described in the present invention by the preparing of the carbon-based particles may be as follows. During the preparation of the carbon-based particles, an oxidation treatment is performed on spherical or chain-type carbon black, in which spherical primary particles have an average diameter of 50 nm or less and the primary particles share the structure, for example, acetylene black under specific conditions. In this case, penetration and oxidation reaction of an oxidizing agent, such as oxygen and acidic vapor, occur from a defect portion such as a grain boundary or a dislocation present in a unit microstructure of the carbon black. When the oxidation treatment is performed for a predetermined time in the temperature range described in the preparation method, the oxidizing agent penetrates into the internal microstructure of the carbon black to cause oxidation. In this case, in order to relieve structural stress of the microstructure of the primary particle which has a radius of curvature greater than a radius of curvature of a surface of the spherical primary particle, an oxidation reaction occurs rapidly in the primary particle. Accordingly, internal carbon atoms are oxidized to gases such as CO, $CO_2$, and $CH_4$, and the primary particles are converted to a hollow type. Most of the structural stresses remaining in the spherical primary particles are also relieved while a surface structure of the hollow-type primary particles is also destroyed by the continuous oxidation treatment, and graphene sheets appear in this process. Thus, the modification process may be accelerated as the average diameter of the carbon black, as the primary particle, is decreased, internal density of the particle is decreased, and an amount of the oxygen functional group in the primary particle is greater than that on the surface of the primary particle. Also, step a is more desirable than step b in terms of the fact that step a may further accelerate the modification process.

The disposing of the carbon-based particles on the core may include at least one selected from a wet process and a dry process. The wet process may include preparing a dispersion including the carbon-based particles and drying after adding and mixing the core and the dispersion with a solvent. The dry process may include mechanical mixing after mixing the carbon-based particles with the core.

In the wet process, the dispersion may include the carbon-based particles, may further specifically include a dispersion medium, and may further more specifically include a dispersion medium and a dispersant. The dispersion medium may be a non-aqueous organic solvent, and may specifically be N-methylpyrrolidone (NMP). The dispersant may include at least one of polyvinylidene fluoride (PVdF) and H-NBR.

In the dispersion, the carbon-based particles may be included in an amount of 0.5 wt % to 4 wt %, for example, 1.5 wt % to 3 wt %. In a case in which the amount of the carbon-based particles satisfies the above range, a coating layer may be smoothly formed.

According to the dry process, a small amount of heat is generated so that the carbon-based particles may be coated on the core by the heat. Particularly, the mechanical mixing may be performed using an acoustic mixer. In a case in which the acoustic mixer is used, the mixing is performed for 2 minutes to 5 minutes per one time, and a total number of mixing times may be 3 to 5. In a case in which the above ranges are satisfied, since the core and the carbon-based particles are sufficiently mixed, the coating layer may be uniformly formed on the core.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Preparation Example 1: Preparation of Carbon-Based Particles (1) Formation of Preliminary Carbon-based Particles (Acetylene Black)

Acetylene black was formed by pyrolysis of acetylene gas having a purity of 98% by instantaneously injecting the acetylene gas into a reaction furnace with an internal temperature of 2,000° C.

(2) Preparation of Carbon-Based Particles

Figure 2:
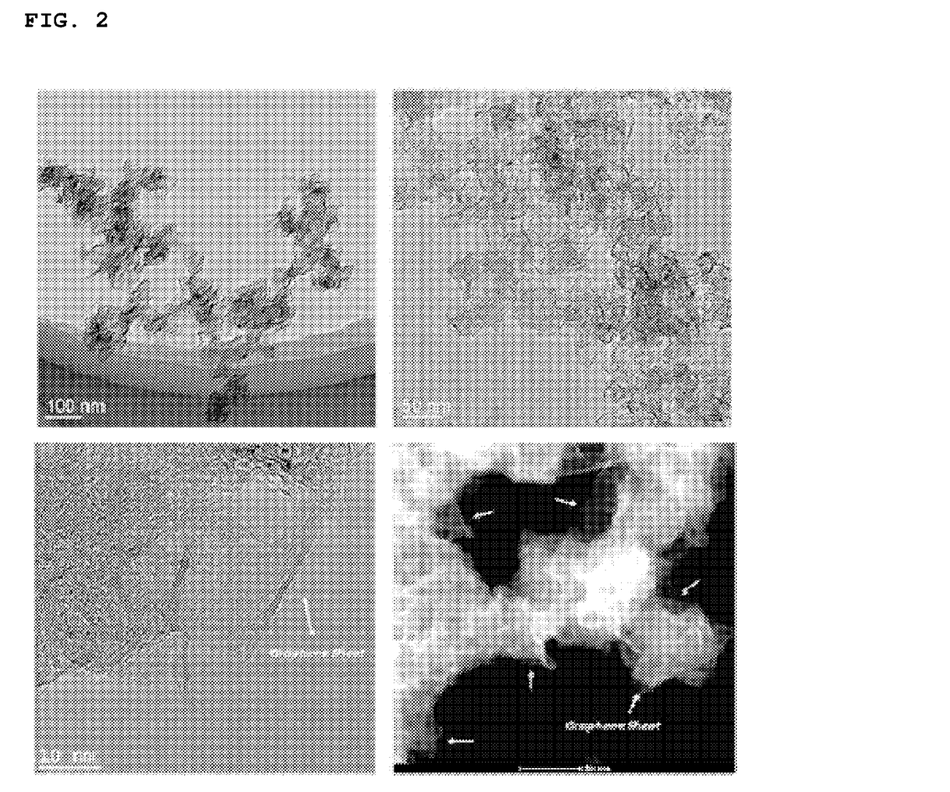
FIG. 2 is TEM and scanning TEM (STEM) images of carbon-based particles included in a positive electrode active material of Example 1.
Figure 3:
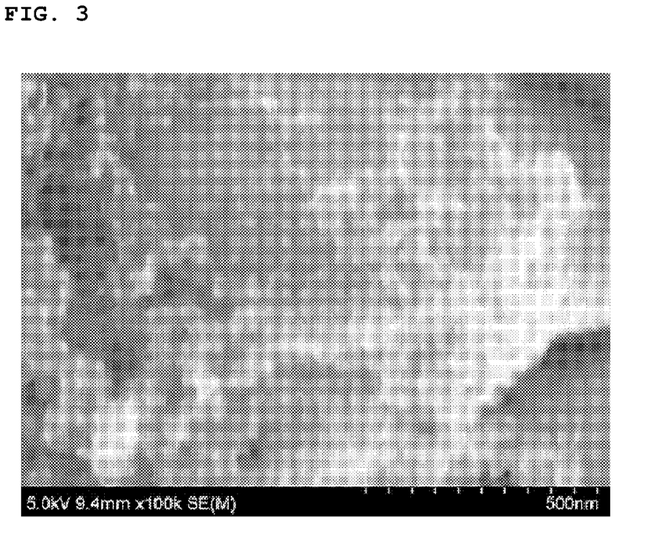
FIG. 3 is a scanning electron microscope (SEM) image of the carbon-based particles included in the positive electrode active material of Example 1.

Subsequently, the internal temperature of the reaction furnace containing the acetylene black was set to 250° C., and an oxidation treatment was then performed for 30 hours while introducing oxygen. As a result, carbon-based particles having a secondary particle structure, which included a shape in which a plurality of graphene sheets having a lateral size of about 41 nm were connected to each other, were obtained. (see FIGS. 2 and 3)

Preparation Example 2: Preparation of Carbon-Based Particles

Figure 4:
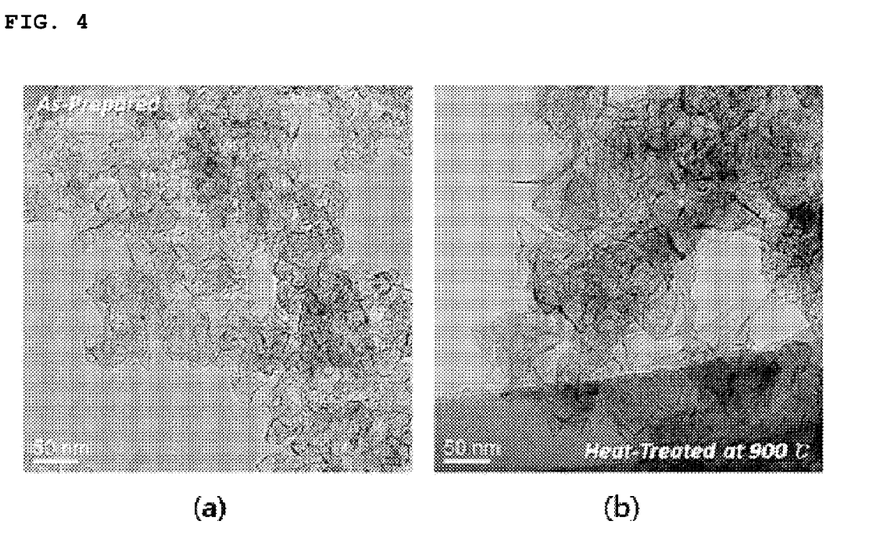
FIG. 4 is (a) a TEM image of carbon-based particles included in the positive electrode active material according to Example 1 and (b) a TEM image of carbon-based particles included in a positive electrode active material according to Example 2.

An additional heat treatment was performed on the carbon-based particles obtained in the preparation of the carbon-based particles of Preparation Example 1 at 900° C. for 1 hour in an inert atmosphere to obtain carbon-based particles having a secondary particle structure which included a shape in which a plurality of graphene sheets having a lateral size of about 65 nm were connected to each other. Referring to FIG. 4, it may be understood that the carbon-based particles of Preparation Example 1 (FIG. 4(a)) were modified to the carbon-based particles of Preparation Example 2 (FIG. 4(b)) by the heat treatment.

Sample 1: Preparation of Carbon Black

Figure 5:
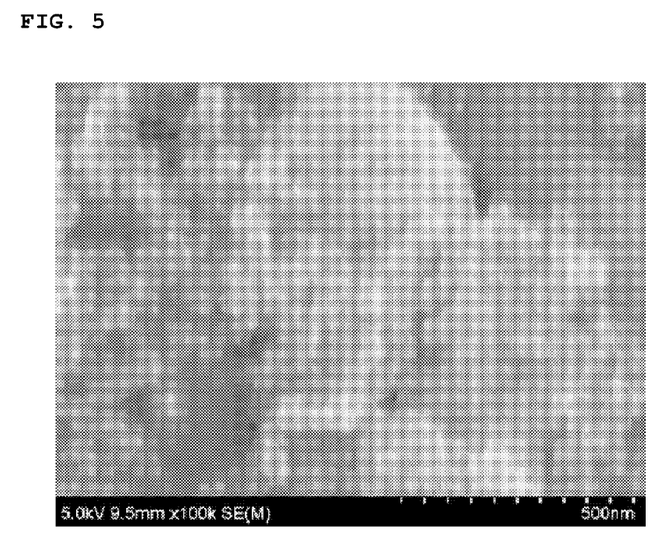
FIG. 5 is an SEM image of carbon black included in a positive electrode active material of Comparative Example 1.

Carbon black in the form of a secondary particle, in which primary particles were aggregated, was prepared. The prepared carbon black primary particles had an average particle diameter of 12 nm. (Denka Company Ltd., Small Acetylene Black (SAB)) (see FIG. 5)

Hereinafter, physical properties of the carbon-based particles of Preparation Examples 1 and 2 and the carbon black of Sample 1 were evaluated and presented in Table 1. Specifically, the physical properties were evaluated by the following methods.

1) Lateral size of graphene sheet (nm): after sizes of 100 graphene sheets in the coating layer were measured with a TEM (JEOL, JEM-2010F), it was evaluated as an average of the sizes.

2) Nitrogen adsorption specific surface area ($m^2/g$): it was measured by degassing at 200° C. for 8 hours and performing $N_2$ adsorption/desorption at 77K using a BET measurement instrument (BEL-SORP-MAX, Nippon Bell).

3) Iodine adsorption value (mg/g): it was measured according to ASTM D1510.

4) Oxygen content (wt %): amounts of C, H, and N elements were measured by elemental analysis equipment (CHN-coder MT-5, Yanako), and the oxygen content (differential) was calculated to reflect an amount of residual ash.

5) Raman spectrum D/G ratio: it was measured by analyzing a Raman spectrum obtained using an Ar-ion laser with a wavelength of 514.5 nm by a Raman spectrometer (NRS-2000B, Jasco).

TABLE 1

| Carbon-based particles or carbon black | Lateral size of graphene sheet or average diameter of carbon black primary particle (nm) | Nitrogen adsorption specific surface area ($m^2/g$) | Iodine adsorption value (mg/g) | $I_b - a$/a | Oxygen content (wt %) | Raman spectrum D/G ratio |
|---|---|---|---|---|---|---|
| Preparation Example 1 | 41 (graphene sheet) | 825 | 849 | 0.029 | 8.9 | 1.42 |
| Preparation Example 2 | 65 (graphene sheet) | 712 | 736 | 0.034 | 3.2 | 1.27 |
| Comparative Example 1 | 12 (carbon black primary particle) | 376 | 456 | 0.213 | 4.7 | 1.68 | a is a specific surface area (m²/g) of the carbon-based particle which is measured by a nitrogen adsorption BET method, and b is an iodine adsorption value (mg/g) of the carbon-based particle.

Example 1: Preparation of Positive Electrode Active Material $Li_6CoO_4$ having an average particle diameter ($D_{50}$) of 16 μm and the carbon-based particles of Preparation Example 1 were mixed by using an acoustic mixer at 1,500 rpm for about 2 minutes three times (total 6 minutes). In this case, a mixing weight ratio of the $Li_6CoO_4$ to the carbon-based particles was 97:3. As a result, a coating layer was formed on the $Li_6CoO_4$ to prepare a positive electrode active material.

Example 2: Preparation of Positive Electrode Active Material

A positive electrode active material was prepared by forming a coating layer in the same manner as in Example 1 except that the carbon-based particles of Preparation Example 2 were used instead of the carbon-based particles of Preparation Example 1.

Comparative Example 1: Preparation of Positive Electrode Active Material $Li_6CoO_4$ having an average particle diameter ($D_{50}$) of 16 μm was prepared as a positive electrode active material of Comparative Example 1.

Comparative Example 2: Preparation of Positive Electrode Active Material $Li_6CoO_4$ having an average particle diameter ($D_{50}$) of 16 μm and the carbon black of Sample 1 were mixed by using an acoustic mixer at 1,500 rpm for about 2 minutes three times (total 6 minutes). In this case, a mixing weight ratio of the $Li_6CoO_4$ to the carbon black was 97:3. As a result, a coating layer was formed on the $Li_6CoO_4$ to prepare a positive electrode active material.

Experimental Example 1: Aging Analysis

Figure 6:
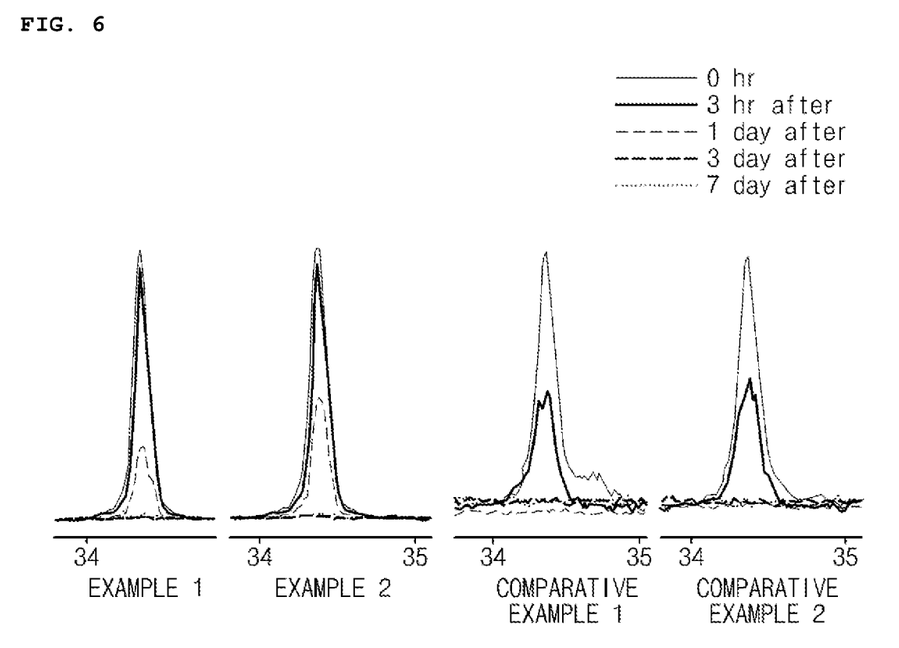
FIG. 6 is graphs illustrating aging of cores in positive electrode active materials of Examples 1 and 2 and Comparative Examples 1 and 2.

X-ray diffraction analysis was performed on each of the positive electrode active materials of Examples 1 and 2 and Comparative Examples 1 and 2 at 0 hour, 3 hours, 1 day, 3 days, and 7 days while the positive electrode active materials were left standing at room temperature and a humidity of 40%, and the results thereof are presented in FIG. 6.

Specifically, in the X-ray diffraction analysis, a peak intensity of a (200) plane of $Li_6CoO_4$ near 2-theta of 34.5 degrees (based on Cu Kα) was confirmed so that there was no overlap with peaks due to other phases.

Experimental Example 2: Battery Performance Evaluation

After batteries were prepared by the following method, the prepared batteries were charged at 0.1 C to a voltage of 4.3 V under a constant current/constant voltage (CC/CV) condition, cut-off charged at 0.005 C, and discharged at a constant current (CC) of 0.1 C to a voltage of 3.0 V to measure first charge capacity, and the results thereof are present in Table 2 below.

Method of Preparing Battery:

(1) Preparation of Positive Electrode

Positive electrodes including each of the positive electrode active materials of Examples 1 and 2 and Comparative Examples 1 and 2 were prepared. PVdF was used as a binder, and carbon black was used as a conductive agent.

The positive electrode active material, the binder, and the conductive agent were mixed in a NMP, as a solvent, at a weight ratio of 96:2:2 to prepare a positive electrode slurry. A 20 μm thick positive electrode collector (Al) was coated with the positive electrode slurry and dried at 130° C. to prepare a positive electrode.

(2) Battery Preparation

A negative electrode active material in which SiO and artificial graphite were mixed in a weight ratio of 1:9, carbon black as a negative electrode conductive agent, a styrene-butadiene rubber (SBR) as a negative electrode binder, and carboxymethyl cellulose (CMC) were mixed in distilled water at a weight ratio of 96.5:2:1:0.5 to prepare a negative electrode slurry. A 10 μm thick negative electrode collector (Cu) was coated with the prepared slurry and dried at 100° C. to prepare a negative electrode.

Thereafter, after a mono-cell was prepared by combining the above-prepared negative electrode and positive electrode with a 15 μm thick polyethylene-based separator disposed therebetween, an electrolyte solution (ethylene carbonate (EC)/ethylmethyl carbonate (EMC)=½ (volume ratio)) and lithium hexafluorophosphate (1 M $LiPF_6$) were injected into the mono-cell to prepare a lithium secondary battery.

TABLE 2

|  | Example 1 | Example 2 | Comparative Example 1 | Comparative Example 2 |
|---|---|---|---|---|
| First charge capacity (mAh/g) | 695.2 | 698.7 | 572.6 | 598.4 |

Referring to FIG. 6, with respect to Examples 1 and 2, it may be understood that aging was slower than that of Comparative Examples 1 and 2. That is, it may be understood that structural collapse of the core ($Li_6CoO_4$) included in each of the positive electrode active materials of Examples 1 and 2 was effectively delayed. This indicates that the coating layer described in the present invention may effectively prevent the core from reacting with external factors, for example, moisture. Also, referring to Table 2, it indicates that the effective delay in the structural collapse of the core may increase the charge capacity of the battery.

When Example 1 and Example 2 were compared, it may be understood that the structural collapse of the core in the positive electrode active material of Example 2 was relatively more delayed, and it may be understood that the charge capacity of the battery using the positive electrode active material of Example 2 was further improved. This indicated that, in a case in which the graphene sheets constituting the carbon-based particles in the coating layer had an appropriate size, the core was more effectively blocked from external factors.

The invention claimed is:

1. A positive electrode active material comprising a core and a coating layer disposed on the core,
wherein the core comprises $Li_{1+x}MO_{2+y}$, wherein M is at least one element selected from the group consisting of nickel (Ni), cobalt (Co), and copper (Cu), and $1 \leq x \leq 5$ and $0 \leq y \leq 2$, and the coating layer comprises carbon-based particles, wherein the carbon-based particle comprises a structure in which a plurality of graphene sheets are connected, the carbon-based particle has an oxygen content of 1 wt % or more in the carbon-based particle, and the carbon-based particle has a D/G peak ratio of 1.55 or less during Raman spectrum measurement.

2. The positive electrode active material of claim 1, wherein the $Li_{1+x}MO_{2+y}$ comprises at least one selected from the group consisting of $Li_2NiO_2$, $Li_6CoO_4$, and $Li_2CuO_2$.

3. The positive electrode active material of claim 1, wherein a weight ratio of the core to the coating layer is in a range of 94:6 to 99.5:0.5.

4. The positive electrode active material of claim 1, wherein each of the graphene sheets have a lateral size of 200 nm or less.

5. The positive electrode active material of claim 1, wherein the carbon-based particle has a value calculated by Equation 1 of 0.12 or less:

$$\frac{|b-a|}{a} \quad \text{[Equation 1]}$$

wherein, in Equation 1, a is a specific surface area (m²/g) of the carbon-based particle which is measured by a nitrogen adsorption Brunauer-Emmett-Teller (BET) method, and b is an iodine adsorption value (mg/g) of the carbon-based particle.

6. The positive electrode active material of claim 1, further comprising a connection portion connected to at least a part of the graphene sheets of the plurality of graphene sheets, wherein the connection portion has a non-graphene shape.

7. The positive electrode active material of claim 6, wherein at least a portion of each of the plurality of graphene sheets is connected to the connection portion.

8. The positive electrode active material of claim 1, wherein each of the graphene sheets have an average thickness of 10 nm or less.

9. The positive electrode active material of claim 1, wherein the carbon-based particle has a specific surface area (m²/g) measured by a nitrogen adsorption BET method of 200 m²/g or more.

10. A method of preparing a positive electrode active material, the method comprising:

preparing carbon-based particles, and disposing the carbon-based particles on a core, wherein the preparing of the carbon-based particles comprises preparing preliminary carbon-based particles, and modifying the preliminary carbon-based particles by an oxidation treatment, wherein the modifying of the preliminary carbon-based particles by the oxidation treatment comprises at least one of a) performing a first heat treatment of the preliminary carbon-based particles at a temperature of 200° C. to 800° C. in at least one atmosphere of an oxygen atmosphere and an air atmosphere; and b) reacting the preliminary carbon-based particles with an acidic vapor at 120° C. to 300° C., and the core comprises $Li_{1+x}MO_{2+y}$, wherein M is at least one element selected from the group consisting of nickel (Ni), cobalt (Co), and copper (Cu), and $1 \leq x \leq 5$ and $0 \leq y \leq 2$.

11. The method of claim 10, wherein the preparing of the preliminary carbon-based particles comprises pyrolysis of acetylene gas at a temperature of 1,500° C. or more.

12. The method of claim 10, wherein the preliminary carbon-based particles comprise at least one selected from the group consisting of acetylene black, furnace black, thermal black, channel black, and lamp black.

13. The method of claim 12, wherein the preliminary carbon-based particles comprise acetylene black.

14. The method of claim 10, further comprising performing a second heat treatment of the preliminary carbon-based particles modified by the oxidation treatment at a temperature of 500° C. or more in an inert atmosphere, after the modifying of the preliminary carbon-based particles by the oxidation treatment.

15. A positive electrode comprising the positive electrode active material of claim 1.

16. A secondary battery comprising:

the positive electrode of claim 15;

a negative electrode;

a separator disposed between the positive electrode and the negative electrode; and an electrolyte.

17. The secondary battery of claim 16, wherein the negative electrode comprises a negative electrode active material layer, and the negative electrode active material layer comprises $SiO_x$ ($0<x<2$).

18. The positive electrode active material of claim 8, wherein the average thickness is 0.34 nm to 10 nm.

19. The positive electrode material of claim 9, wherein the specific surface area is 200 m²/g to 1,100 m²/g.

20. The method of claim 11, wherein the pyrolysis of the acetylene gas is performed at the temperature of 1,500° C. to 2,200° C.

* * * * *